United States Patent
Kadowaki

[15] 3,707,326
[45] Dec. 26, 1972

[54] AUTOMATIC FILM REWIND DEVICE FOR MOVIE PROJECTORS OF THE SMALL TYPE

[72] Inventor: Tatsusuke Kadowaki, Yokohama, Japan
[73] Assignee: Kabushiki Kaisha Ricoh, Tokyo, Japan
[22] Filed: Sept. 21, 1970
[21] Appl. No.: 73,814

[30] Foreign Application Priority Data

Oct. 4, 1969 Japan .................................. 44/79391

[52] U.S. Cl. ................. 352/124, 352/159, 352/173, 352/174, 242/186, 242/205
[51] Int. Cl. .......................................... G03b 23/00
[58] Field of Search ........ 352/92, 124, 174, 173, 166, 352/159, 189; 242/189, 186, 205; 226/25

[56] References Cited

UNITED STATES PATENTS

| | | | |
|---|---|---|---|
| 1,944,024 | 1/1934 | Foster et al. | 352/92 |
| 3,240,550 | 3/1966 | Mitchell et al. | 352/124 |
| 3,300,155 | 1/1967 | Roman | 242/189 |
| 3,584,943 | 6/1971 | Roman | 352/124 |
| 2,838,304 | 6/1958 | Berkenhoff | 352/159 X |

*Primary Examiner*—Samuel S. Matthews
*Assistant Examiner*—Russell E. Adams, Jr.
*Attorney*—McGlew and Toren

[57] ABSTRACT

An automatic film rewind device for movie projectors of the small type effects automatic rewinding of the film rsponsive to detection of tensioning of the film, wound on the shaft of a supply reel, at the terminating stage of film supply. The device further is operable selectively to effect single-frame projection, as well as projection of the film while moving in the rewind direction. Externally excessible operating means are manually operable to effect rewinding of the film. The device includes a control cam group movable between forward film feed, neutral and reverse film feed positions by an externally accessible control knob, and a control lever group is engaged with the control cam group. This control lever group sets the components of the projector to either feed film forwardly or to rewind film, and is locked in the forward feed film position by a holding member which is released responsive to the mentioned tensioning of the film in the last stage of film supply. A locking lever is operable to lock the control cam group in either the forward film feed position or the neutral position, and is released automatically responsive to such tensioning of the film.

10 Claims, 13 Drawing Figures

PATENTED DEC 26 1972

INVENTOR.
TATSUSUKE KADOWAKI
BY McGlew and Toren
ATTORNEYS

INVENTOR.
TATSUSUKE KADOWAKI

INVENTOR
TATSUSUKE KADOWAKI
BY McGlew and Toren
ATTORNEYS

AUTOMATIC FILM REWIND DEVICE FOR MOVIE PROJECTORS OF THE SMALL TYPE

BACKGROUND OF THE INVENTION

In 8mm movie projectors using a film cartridge, difficulties are encountered in attaching a film to the film supply reel in a film cartridge when the film is to be rewound into the film cartridge, if the film is disengaged from the shaft of the film supply reel and wound completely onto the film take-up reel in projecting the film. Thus, the trailing end of the film housed in the film cartridge is attached, as by adhesive tape, to the shaft of a film supply reel in the film cartridge. This prevents the film from being detached from the supply shaft and wound completely on the take-up reel.

However, in movie projectors using a film cartridge as just described, there is a problem concerning the breakage of the film or damage to the film, which is liable to occur at the terminating stage of the film pay-out. If film pay-out is carried out in spite of the fact that the amount of film on the supply reel has been reduced, while projecting the film, tensioning of the film will occur between the portion of the film which is secured to the supply reel and the portion of the film being paid out, when the film on the supply reel shaft nears its end. This may cause breakage of the film or damage to the film.

This problem can be solved by interrupting take-up of the film by the take-up reel, or by starting rewinding of the film, before tensioning of the film occurs upon completion of projection. If this operation is carried out manually, difficulties are encountered in selecting the opportune time for effecting switching from advance to rewind, and failures in operation may be expected. Therefore, it is desirable that this operation should be performed automatically by suitable means.

SUMMARY OF THE INVENTION

This invention relates to automatic film rewind devices for movie projectors of the small type and, more particularly, to a novel and improved automatic film rewind device for 8mm movie projectors using a film cartridge.

In accordance with the invention, a film rewind device, for small sized movie projectors, automatically rewinds film responsive to detection of tensioning of the film in the film supply section during the terminating stage of film pay-out from the film supply reel to the shaft or to the film take-out reel on which the film is wound. Thus, the rewind device of the invention not only eliminates the difficulties involved with manual switching but also prevents disengagement or uncoupling of the film from the film supply reel shaft, during the terminating stage of film pay-out, and prevents breakage of and damage to the film.

Additionally, the automatic film rewind device of the invention permits projection of a single frame of a film, permits reverse movement of the film, at will, and provides for manually initiated rewinding of the film as desired.

An object of the invention is to provide an automatic film rewind device for small size movie projectors, and which is free of the disadvantages of prior art arrangements.

Another object of the invention is to provide such an automatic rewind device which operates to switch from film advance to film rewind responsive to tensioning of a film as the film approaches complete pay-out from a film supply reel.

A further object of the invention is to provide such a device which is selectively operable to advance the film, to rewind the film, to project a single frame, or to rewind the film responsive to manual control.

Another object of the invention is to provide such an automatic rewind device, for small size movie projectors, which are simple, inexpensive, and reliable in operation.

In understanding of the principles of the invention, reference is made to the following description of a typical embodiment thereof as illustrated in the accompanying drawing.

DESCRIPTION OF THE PREFERRED EMBODIMENT

Figure 1:
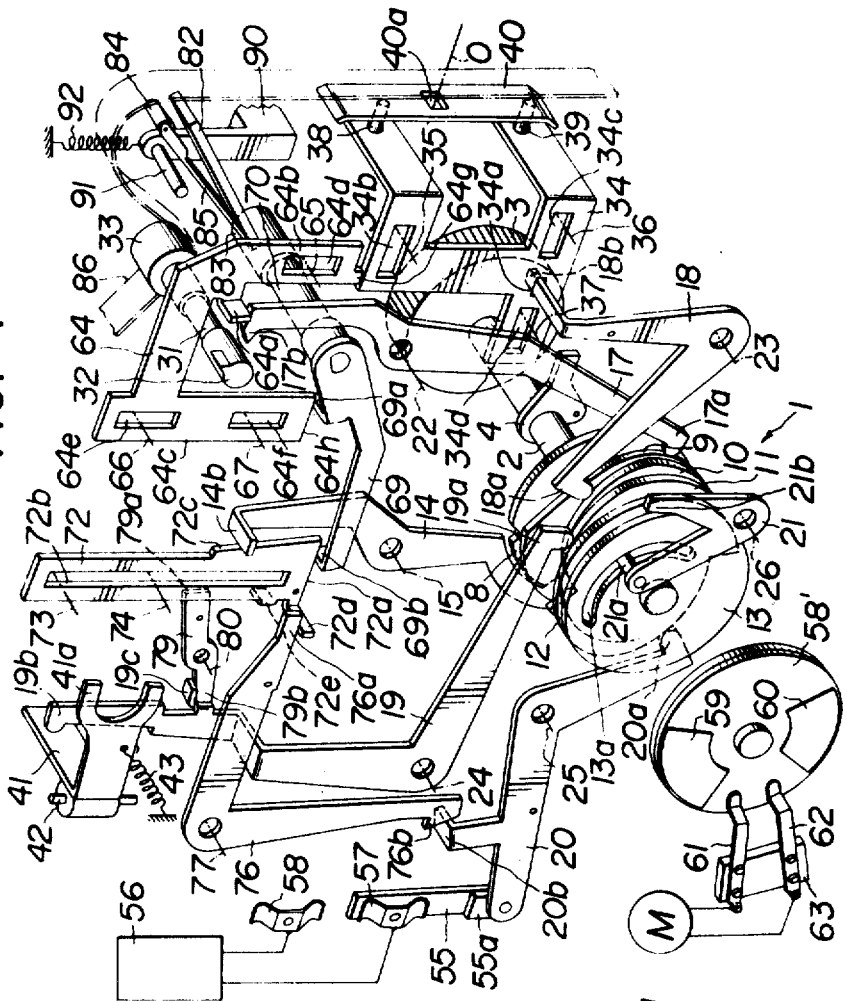
FIG. 1 is a somewhat exploded perspective view of an automatic film rewind device, for small size movie projectors, embodying the invention.
Figure 5:
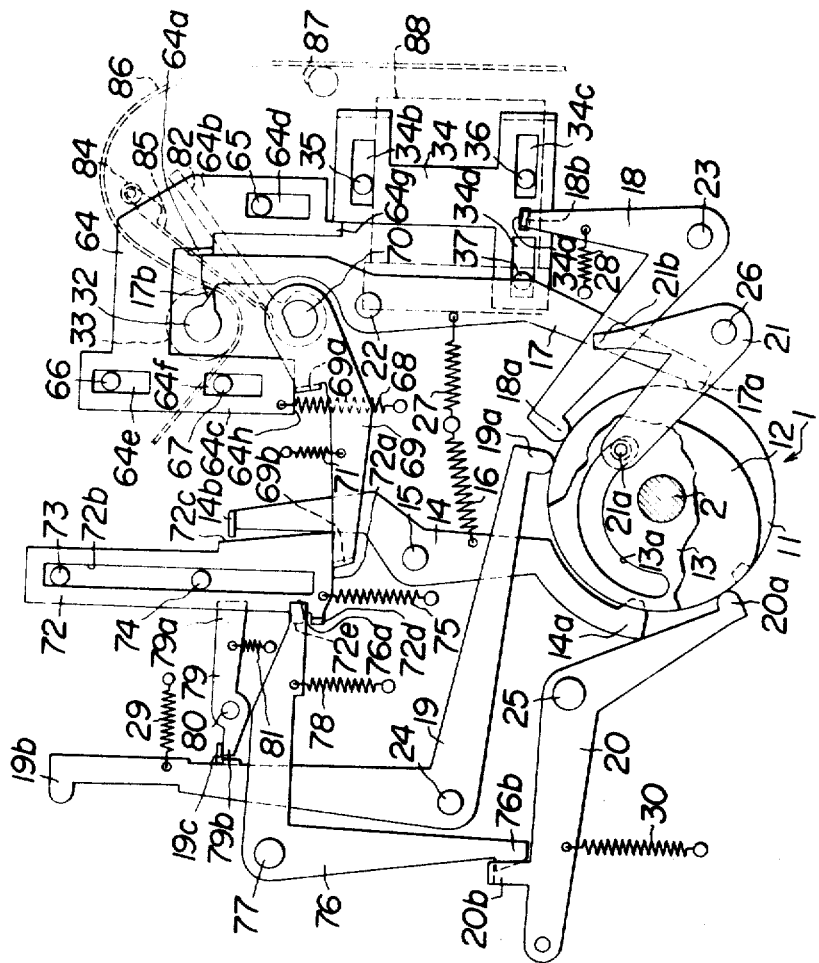
FIG. 5 is a side elevation view of the device embodying the invention illustrating the position of the parts during normal projection for screening.

Referring to FIG. 1, a projection lens 88, shown in broken lines in FIG. 5, has an optical axis O and is positioned on the left side of a film pressing plate 40, and a lamp housing (not shown) is positioned on the right side of film pressing plate 40. A control cam group 1 is secured to the inner end portion of a shaft 2 rotatably supported by the housing or casing (not shown) of the movie projector, and an operating knob 3 is secured to the outer end portion of shaft 2 and positioned externally of the housing or casing portion in which projection lens 88 is mounted.

Figure 2:
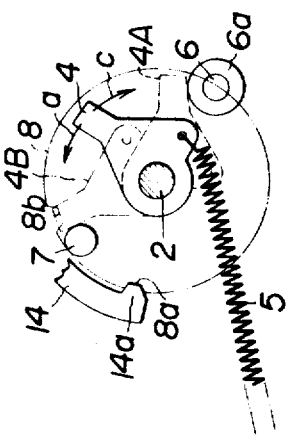
FIG. 2 is a side elevation view illustrating means for locking a control cam group.

A rotation limiting member 4 is mounted on an intermediate portion of shaft 2, and a tension spring 5 has one end secured to member 4, as shown in FIG. 2, so that member 4 is urged to pivot clockwise about the axis of shaft 2. The range of pivotal movement of the member 4 is limited by a stop 6, best seen in FIG. 2, which is surrounded or embraced by a resilient member 6a, such as a rubber bumper. Under the tension of spring 5, member 4 is maintained in the broken line position 4A in which it is engaged with the bumper 6a. Stop 6 is secured to the inner surface of a side wall of the projector. Another stop 7 is secured to the inner surface of the projector side wall in a position in which it is disposed in the path of counterclockwise pivotal movement of member 4. If operating knob 3 is manipulated from the exterior to rotate shaft 2 counterclockwise, as viewed in FIG. 2, and against the bias of spring 5, then the degree of angular movement of shaft 2 is limited by rotation limiting member 4 abutting stop 7.

Control cam group 1 comprises a disc 8 and cams 9, 10,11,12 and 13. Disc 8 is formed with notches 8a and 8b in its outer peripheral surface, as best seen in FIG. 2. If operating knob 3 is manipulated to rotate shaft 2 against the bias of spring 5, notch 8a will be releasibly engaged by a locking portion 14a of a cam group locking lever 14 arranged to press against disc 8 when member 4 is brought to a position in which it abuts stop 7. Notch 8b will be releasably engaged by locking portion 14a of lever 14 when member 4 is brought to the solid line position of FIG. 2, in which it is disposed midway between stops 6 and 7.

Locking lever 14 is supported for pivotal movement by a shaft 15 and is biased by a spring 16 to pivot counterclockwise, as viewed in FIG. 5. The releasable engagement in cutouts 8a and 8b by locking lever 14 also affects operating knob 3.

When knob 3 is turned in a direction opposite to that in which shaft 2 is biased to rotate by spring 5, operating knob 3 is also releasably latched in a position in which rotation limiting member 4 is disposed as mentioned. If operating knob 3 is turned and rotation limiting member 4 is moved to the position 4B shown in FIG. 2, then the film can be moved in normal or forward film feed direction for projection in a manner to be described hereinafter. If rotation limiting member 4 is disposed in the position 4A in FIG. 2, then the film can be rewound or can be moved in the reverse direction for projection. If member 4 is moved to the intermediate or neutral position, then the movie projector is rendered inoperative. The positions for film feed forward movement, non-operation and film feed rewind or reverse movement are indicated by suitable cooperating means on knob 3 and the side wall of the projector, so that knob 3 can be manipulated in accordance with these indications.

As best seen in FIG. 1, cams 9,10,11 and 12 of control cam group 1 cooperate, respectively, with a holding member locking lever 17, a pressing plate operating lever 18, a clutch operating lever 19 and a power source lever 20. Cam 13 is formed with a slot 13a which loosely receives a pin 21a secured to the end of an arm of a normal-reverse direction switching lever 21. Levers 17, 18, 19, 20 and 21 are pivotally supported by respective shafts 22,23,24,25 and 26, which are secured to the inner surface of the side wall of the projector. Respective springs 27, 28, 29 and 30 are secured to levers 17, 18, 19 and 20, as best seen in FIG. 5, so as to bias the associated levers to press against the respective cams 9,10,11 and 12.

Figure 4A:
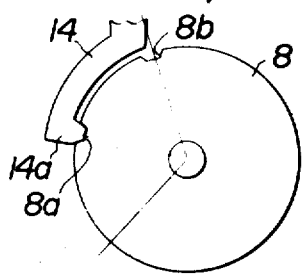
FIGS. 4A through 4E are partial elevation views illustrating the relation between each member of the control cam group and each member of a control lever group.
Figure 4D:
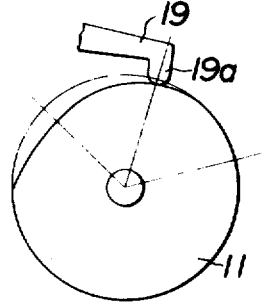
Figure 4B:
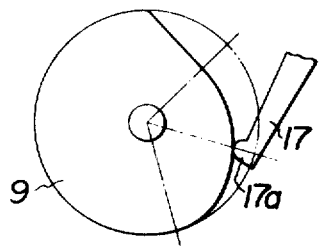
Figure 4E:
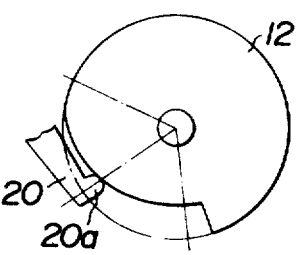
Figure 4C:
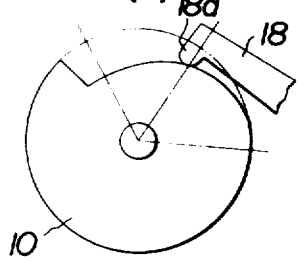

In FIG. 1, operating knob 3 is disposed in its neutral or non-operation position. When the automatic film rewind device is in the state illustrated in FIG. 1, notch 8a of disc 8 is engaged by locking portion 14a of cam group locking lever 14, as shown in FIG. 4A, and each cam of group 1 and its associated lever of the control lever group is disposed in the relative position as shown in FIGS. 4B through 4E.

In FIG. 1, the end 17a of one arm of holding member locking lever 17 presses against a minor diameter portion of cam 9 (FIG. 4B), and a locking pawl 17b at the end of the other arm of lever 17 cooperates with an engaging pawl 32 secured on the inner end of the shaft 31 rotatably supported by the projector side wall. Mounted on the outer end portion of shaft 31, which extends outwardly of the side wall of the projector, there is a rubber resistance roller 33 which is adapted to offer resistance to the movement of film in the film supply section as the film is advanced, as subsequently to be described, so as to aid in forming a film loop.

The end 18a of one arm of pressing plate operating lever 18 engages a minor diameter portion of cam 10 (FIG. 4C), and the other arm 18b is bent and engaged in an opening 34a formed in a pressing plate supporting member 34. Member 34 is formed further with slots 34b, 34c, and 34d which loosely receive respective pins 35, 36, and 37 secured to the projector side wall. These pins support member 34 for sliding movement parallel to optical axis O.

Figure 3:
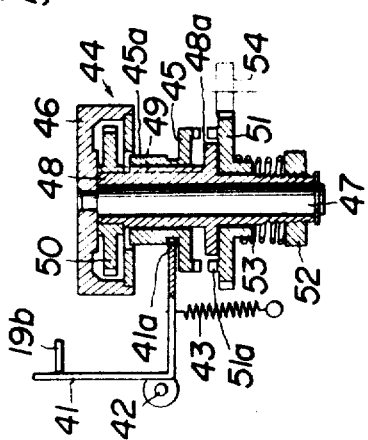
FIG. 3 is a fragmentary sectional view illustrating mechanism for driving the film supply reel shaft in the reverse or rewind direction.

Support member 34 includes upper and lower arms which are bent at right angles and loosely mount, at their ends, respective pins 38 and 39. A film pressing plate 40 is secured to pins 38 and 39 and is disposed in a position removed from the path of film movement when lever 18 is engaged with the minor diameter portion of cam 10. The end 19a of one arm of such operating lever 19 presses against the major diameter portion of cam 11, and the other arm 19b of lever 19 is positioned against one arm of a shifter 41 pivotally supported by a vertical shaft 42. Shifter 41 is biased by a spring 43 to pivot clockwise about shaft 42, as viewed from above in FIG. 1, and has a second arm formed with a forked portion 41a which is engaged in a groove formed on the outer periphery of a cylindrical hub 45a of a clutch ring 45 of a reverse film feed operation mechanism 44 for the film supply reel shaft (not shown), as shown in FIG. 3. In FIG. 3, a shaft 47 is secured to a support arm 46 for the film supply reel shaft, and a sleeve 48 is fitted loosely over shaft 47 and has a flange 48a. Shaft 47 mounts, in a position nearer to its base than to the flange 48a, a clutch ring 45 which, through the medium of a key 49, is slidable axially of shaft 47 but rotates with sleeve 48 as a unit. A gear 50 is secured to the base end of sleeve 48 and is connected to the film supply reel shaft through a gear train (not shown) provided in support arm 46.

A gear 51 is fitted loosely over sleeve 48 in a position forwardly of flange 48a, and a spring 53 is mounted on sleeve 48 between gear 51 and a stop ring 52 threadably connected to the front end of sleeve 48. Thereby, gear 51 is caused to press frictionally against flange 48a. Gear 51 is connected to a motor M (FIG. 1) through a gear 54 (FIG. 3) with which the gear 51 is brought into meshing engagement, by suitable means, only when the film is moved in a reverse direction.

Gear 51 is formed with a clutch portion 51a adapted to engage clutch ring 45. Lever 19 is kept in pressing engagement with the major diameter portion of cam 11 when the device is in the state shown in FIG. 1, so that lever 19 presses shifter 41 against the bias of spring 43. As a result, shifter 41 causes clutch ring 45 to be released from engagement with gear 51, as illustrated in FIG. 3.

End 20a of one arm of power source lever 20 presses against the minor diameter portion of cam 12 (FIG. 4E) when the device is in the state shown in FIG. 1, and the other arm of lever 20 moves downwardly a movable contact 55 connected to lever 20 through an insulating member 55a. One fixed contact 57, which forms, with another fixed contact 58, a power source switch for a lamp 56 serving as the power source for projection is maintained in engagement with movable contact 55. The other fixed contact 58 is positioned above contact 57. Contacts 57 and 58 are interconnected through movable contact 55 when lever 20 moves contact 55 upwardly, so that lamp 56 can be energized.

Cam slot 13a in cam 13 effects pivotal movement of normal-reverse direction switching lever 21 about the axis of pin 21a when operating knob 3 is turned into the normal film feed direction position, the neutral position, and the reverse film feed direction position. A lever mechanism (not shown), for switching motor M between forward and reverse rotation, is connected to the other arm 21b of lever 21. When knob 3 is turned to the normal film feed direction position, motor M drives a film take-up reel shaft (not shown) in the normal direction. When knob 3 is turned to the neutral position, motor M does not drive the film take-up reel shaft and, when knob 3 is turned to the reverse direction movement position, motor M drives gear 54, shown in FIG. 3, in the reverse direction. Operating knob 3 is shown in the neutral position in FIG. 1, so that motor M is inoperable in this position.

As best seen in FIG. 1, an electrically non-conductive, or dielectric, disc 58' is secured to the inner end of shaft 2, and carries two segmental conducting plates 59 and 60. Power supply contacts 61 and 62 for motor M are supported on a support 63 and maintained pressing against disc 48. In the position shown in FIG. 1, contacts 61 and 62 are in engagement with dielectric disc 58, so that there is no current flowing to motor M. If knob 3 is turned to the normal film feed movement direction position, or to the reverse film rewind direction position, disc 58' will also be turned and either plate 59 or plate 60 will be engaged with contact 61 and 62, thereby energizing motor M.

In the position of the parts shown in FIG. 1, a bent portion 64a of a holding member 64 is maintained pressed against the end of that arm of holding member locking lever 17 carrying locking pawl 17b. Member 64 has depending arms 64b and 64c formed with slots 64d, 64e, and 64f, and respective fixed pins 65, 66 and 67 are loosely received in these slots to support holding member 64 for vertical sliding motion. Member 64 is biased downwardly by a spring 68, as best seen in FIG. 5. With the parts in the position shown in FIG. 1, member 64 is locked in position by locking lever 17 and precluded from moving downwardly.

One arm of member 64 has a holding portion 64g for engaging and holding support member 34 of film pressing plate 40, and portion 64 is disposed on the upper edge of support member 34 in the position shown in FIG. 1. A bent portion 69a, formed in one arm of member 69, is positioned against lower end edge 64h of the other arm of member 64. The base of member 69 is secured to the inner end of a shaft 70 rotatably supported by the projector side walls, and a spring 71, having slightly less bias than spring 68 secured to holding member 64, is secured to member 69 to bias this member to pivot clockwise about the axis of shaft 70, as viewed in FIG. 5.

A bent portion 69b on the other arm of member 69 is positioned against the lower end edge 72a of release member 72, as shown in FIG. 1. Release member 72 is formed with a vertically oriented rectangular opening 72b loosely receiving pins 73 and 74 to support member 72 for vertical sliding motion. A spring 75 (see FIG. 5), having a slightly greater bias than spring 71 engaging member 69, is secured to release member 72 to bias member 72 to move downwardly. An inclined edge 72c, which diverges downwardly, is formed in the lower portion of one edge of release member 72.

With the parts in the position shown in FIG. 1, a bent portion 14b at the end of the upper arm of cam group locking lever 14 is positioned against the upper part of inclined edge 72c. Bent portions 72d and 72e are formed in the lower portion of the other edge of releasing member 72, with portion 72d being pressed, from above, by an end 76a of one arm of a power source holding lever 76 pivotally supported by a shaft 77 and biased clockwise by a spring 78 (see FIG. 5). An engaging portion 76b at the end of the other arm of lever 76 engages a bent portion 20b of power source lever 20. One arm 79a, of a holding lever 79 pivotally supported by a shaft 80 and biased clockwise by a spring 81 (see FIG. 5), is disposed in the path of movement of bent portion 72e. With the parts in the position shown in FIG. 1, the other arm 79b of holding lever 79 is positioned against a bent portion 19c in the upwardly extending arm of holding lever 19.

A sleeve 83, supporting an arm 82, is secured to the outer end portion of shaft 70 of member 69, and a resilient plate 85 having a roller 84 secured to its free end has its base secured to the base portion of arm 82.

Figure 6:
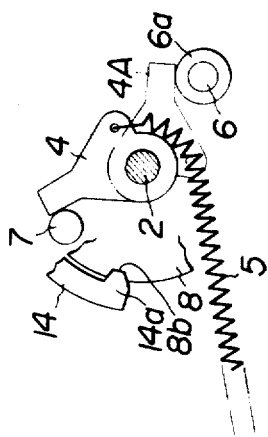
FIG. 6 is a fragmentary side elevation view illustrating the locking of the control cam group when the film is advanced in the normal direction for projection.

The automatic film rewind device described above operates in a manner which will now be explained, with reference being made first to its operation for film movement in a normal or forward film speed direction for projection of the film. If operating knob 3 is turned counterclockwise, as viewed in FIG. 1, rotation limiting member 4 is also rotated counterclockwise or in the direction of the arrow a of FIG. 2 and moves into the position 4B where it abuts stopper 7 and disc 8 has its notch 8b releasably locked by the end 14a of lever 14 so that knob 3 is releasably held in the position illustrated in FIG. 6. As a result, control cam group 1 is moved to the forward film feed position and actuates the control lever group. Thereby, levers 17, 18 and 20 are brought into engagement with the major diameter portions of the respective cams 9, 10 and 12, and normal-reverse direction switching lever 21 is moved, by cam 13, to condition motor M for driving the projector components in the forward film feed direction. Segmental conducting plate 59 is rotated with disc 58' to interconnected contacts 61 and 62 to complete an energizing circuit for motor M. At this time, clutch operating lever 19 is still maintained in engagement with the major diameter portion of cam 11, so that it remains in a position in which it presses against clutch shifter 41. As a result, clutch ring 45, of FIG. 3, is spaced axially from clutch portion 51a of gear 51. Gear 54 is disengaged from gear 51.

When holding member locking lever 17 moves from a position in which it engages the minor diameter portion of cam 9 to a position in which it engages the major diameter portion of cam 9, it pivots counterclockwise about the axis of shaft 22, and its pawl 17b engages pawl 32 of resistance roller 33. At the same time, the end of the upper arm of lever 17 moves out of engagement with bent portion 64a of holding member 64, as seen in FIG. 5.

When pressing plate operating lever 18 moves from a position in which it engages the minor diameter portion of the cam 10 to a position in which it engages the major diameter portion of cam 10, it pivots clockwise about the axis of shaft 23 and moves supporting member 34 for pressing plate 40 to the right, as viewed in FIG. 1, so that pressing plate 40 is disposed in the path of travel of the film, as illustrated in FIG. 5. As member 34 slides to the right, holding member 64, which is no longer locked in an upper position by lever 17, moves downwardly and its portion 64g engages the left upper corner of member 34, also as viewed in FIG. 5.

Upon rotation of motor M, a film 86 is paid out from a supply reel in a film cartridge (not shown) through a guide (not shown) to a film supply section where the film passes beneath resistance roller 33 and forms a loop, after which the film is delivered to the rear surface of pressing plate 40 over a guide roller 87, shown in FIG. 5. An aperture 40a is formed in pressing plate 40, and film 86 is advanced intermittently by film stepping means (not shown) in this section of the projector.

When power source lever 20 moves out of engagement with the minor diameter portion of cam 12 and into engagement with the major diameter portion of this cam, it pivots clockwise about the axis of shaft 25 and moves switch contact 55 upwardly to interconnect the contacts 57 and 58 to complete an energizing circuit for power source lamp 56. At the same time, bent portion 20b of lever 20 engages portion 76b of holding lever 76 so that lever 20 is held in the position shown in FIG. 5 by power source holding lever 76.

The successive frames of film 86, as advanced intermittently passed aperture 40a, are projected on a screen by cooperation of the light source lamp 56, the usual shutter and the projection lens 88, and the film is wound up on a film take-up reel driven in a normal direction by motor M.

Figure 7:
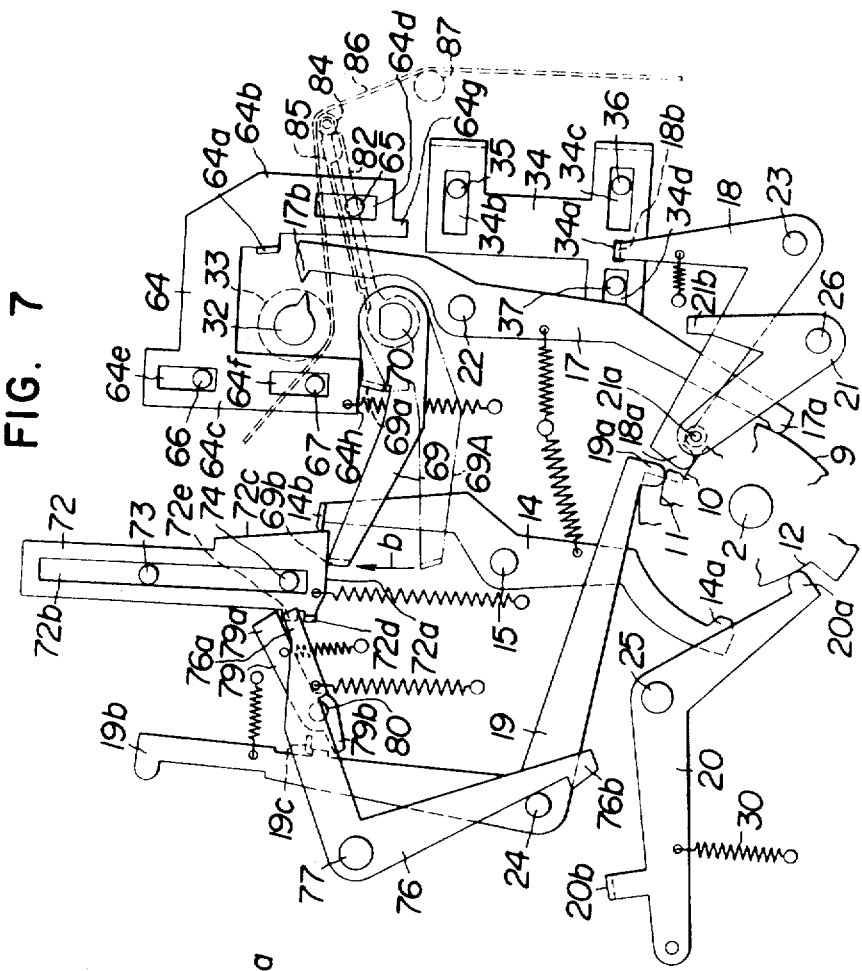
FIG. 7 is a side elevation view of the invention device illustrating the position of the parts during rewinding of the films.

The automatic reversing of the direction of film movement will now be described. The trailing end of film 86 is secured to the reel shaft in the film cartridge so that film 86 is tensioned in the film supply section when nearly all the film on the reel shaft has been paid out and film 86 is drawing near its end. When film 86 is tensioned, it moves roller 84 in arm 82 downwardly, as shown in FIG. 7. Accordingly, arm 82 is pivoted clockwise, as viewed in FIG. 5, and arm 69 is also pivoted clockwise, or in the direction of the arrow b, from the dash-and-dot line position 69A to the solid line position, as viewed in FIG. 7. When member 69 moves in the direction of arrow b, its bent portion 69a moves holding member 64 upwardly and its bent portion 69b moves releasing member 72 upwardly.

Figure 8:
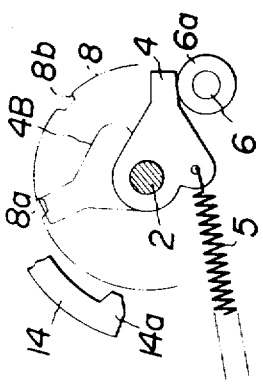
FIG. 8 is a fragmentary side elevation view illustrating the locking of the control cam group during rewinding of the film.

As releasing member 72 is moved upwardly, its inclined edge 72c, engaging bent portion 14b of lever 14, pivots lever 14 clockwise about the axis of shaft 15 to release its depend end 14a from engagement with notch 8b of disc 8. As disc 8 is thus disengaged from locking lever 14, shaft 2 rotates clockwise until member 4 abuts stop 6, as viewed in FIG. 8, due to the bias of spring 5. The resilient sleeves 6a on stop 6 absorbs the shock of engagement between member 4 and stop 6. Roller 84, together with arm 82, prevents damage to film 86 which might occur if only arm 82 were provided.

As shaft 2 rotates clockwise, operating knob 3 and control cam 1 are rotated automatically into the reverse film feed position. Holding member locking lever 17 moves out of engagement with the major diameter portion of cam 9 and into engagement with the minor diameter portion thereof, and thus pivots clockwise about the axis of shaft 22, as viewed in FIG. 5, so that locking pawl 17b disengages pawl 32 to unlock resistance roller 33. At the same time, holding member locking lever 17 is moved clockwise to bring its bent end portion 17b beneath bent portion 64a of member 64 which has been moved to its upper position by the bent portion 69a of member 69, so that the parts occupy the position shown in FIG. 7.

Pressing plate operating lever 18 moves out of engagement with the major diameter portion of cam 10 and into engagement with the minor diameter portion thereof so that it is pivoted counterclockwise about the axis of shaft 23 as viewed in FIG. 5. At this time, support member 34 for plate 40 has been released from locking engagement with holding portion 64g of member 64, so that it is moved to the left, as viewed in FIG. 7, by bent portion 18b of lever 18 to move plate 40 out of the path of travel of the film and thereby release the film from engagement with plate 40.

As releasing member 72 has been moved upwardly by bent portion 69b of member 69, its bent portion 72d moves power source holding lever 76 counterclockwise and its bent portion 72e moves arm 79a of lever 79 counterclockwise. The counterclockwise movement of lever 76 about the axis of shaft 77 releases its end 76b from engagement with bent portion 20b of power source lever 20, and the counterclockwise rotation of holding lever 79 about the axis of shaft 80 releases its end 79b from bent portion 19c of clutch operating lever 19.

At the same time, clutch operating lever 19 and power source lever 20 engage the minor diameter portions of the respective cams 11 and 12 so that lever 19 and 20 are released from engagement with the respective lever 79 and 76. Clutch operating lever 19 pivots clockwise about the axis of shaft 24 into pressing engagement with cam 11, and power source lever 20 moves counterclockwise about the axis of shaft 25 into pressing engagement with cam 12.

With clutch operating lever 19 in the position shown in FIG. 7, its end 19b no longer presses against clutch shifter 41 (see FIG. 1), and shifter 41 pivots clockwise about shaft 42, as viewed from above in FIG. 1, under the bias of spring 43. Thereby clutch ring 45 (FIG. 3) is engaged with clutch portion 51a of gear 51 by the forked portion 41a of shifter 41. When lever 20 is moved to the position shown in FIG. 7, it moves switch contact 55 downwardly to disengage contacts 57 and 58 and thereby break the energizing circuit of lamp 56.

As cam 13 is moved to the reverse film feed position, normal-reverse rotation switching lever 21 and motor M are also conditioned for reverse movement of the film. At this time, gear 54 is meshed with gear 51 (FIG. 3) and the film take-up reel (not shown) is disconnected from the drive mechanism. As shaft 2 rotates to the reverse film feed position, conducting plate 59 of disc 58' (FIG. 1) is disengaged from contact 61 and 62 and conducting plate 60 is engaged with these contacts to maintain energization of motor M. As motor M rotates in a reverse film feed direction, its rotation is transmitted to gear 51 through gear 54, and thus to the film supply reel through clutch ring 45, sleeve 48 and gear 50. Thereby, the film supply reel shaft is rotated in the reverse direction so that film 86 is rewound on the film supply reel with no resistance being offered to the rewinding movement of the film.

Figure 9:
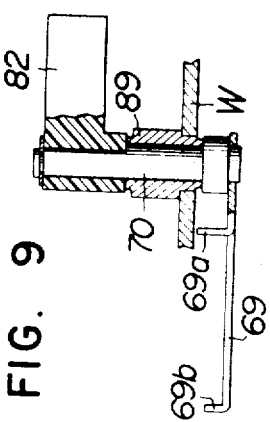
FIG. 9 is a sectional view illustrating a lever mechanism movable responsive to tensioning of the film.

It should be noted that shaft 70, to which is secured arm 82 pressed by the tensioned film 86, is fitted in a sleeve 89 secured to a side wall W of the projector, as seen in FIG. 9, and that liquid of high viscosity, such as silicone oil is applied between sleeve 89 and the peripheral surface of shaft 70 so as to slow down rotation of shaft 70.

The control lever group operates, when the film is moved in the reverse direction, such that rewinding of the film is effected through the following steps:

1. De-energization of power source lamp 56,
2. Retraction of film pressing plate 40 from the path of travel of the film and releasing of resistance rubber roller 33 for free rotation, and
3. Engaging of clutch ring 45 with clutch portion 51a of gear 51. Once the component parts of the projector are placed in the film rewind position, they are maintained in this position even if the film is released from pressing engagement with arm 82. The component parts can be returned to a neutral position, as shown in FIG. 1, by turning operating knob 3 into a neutral position upon completion of film rewinding. When this occurs, the current supply to motor M is interrupted so that it stops rotating and the projector is rendered non-operating.

The operation of the invention device during single-frame projection and reverse movement of the film will now be explained. During single-frame projection, the component parts of the projector are set in the forward film feed position, and the film is moved forwardly from projecting. When it is desired, under these conditions, to effect single-frame projection, operating knob 3 is manipulated to turn it into the neutral position. If the operating knob is moved to the neutral position from the position shown in FIG. 5, cam group locking lever 14, with its end 14a, engages into cutout 8a of disc 8, with the result that all levers of the group, except for the clutch operating or controlling lever 19, are brought into engagement with the minor diameter portions of the respective cams (see FIGS. 2 and 4).

With the device in this condition, holding member locking lever 17 continues to lock rubber roller 33 against rotation because the locking pawl 17b, restraining rotation of rubber roller 33, is retained by bent portion 64a of holding member 64, as seen in FIG. 5. Film pressing plate 40 remains in a position in which it is disposed in the path of travel of the film, because holding member 34 for plate 40 is locked in position by engagement of holding portion 64g of holding member 64 with its upper left corner, as shown in FIG. 5. Clutch ring 45 (FIG. 3) is spaced axially from gear 51, because clutch operating lever 19 is maintained in pressing against the major diameter portion of cam 11. Switch contact 55 interconnects contacts 57 and 58 of lamp 56 because power source lever 20 is retained by holding lever 76, so that lamp 56 remains lid.

On the other hand, if knob 3 is turned to the neutral position, then the normal-reverse direction switching lever 21 is also moved to a neutral position, by its engagement with cam slot 13a of cam 13, so that motor M is placed in a neutral position where it does not drive the film. Reverse direction driving gear 54 (FIG. 3) is disengaged from gear 51, and disc 58' is also moved to a neutral position so that contacts 61 and 62 controlling the energizing circuit of motor M are out of engagement with the segmental conducting plates 59 and 60, so that motor M is de-energized. Thus, film 86 remains stationary and the frame then at the aperture 40a of plate 40 is projected on the screen as a still picture.

If knob 3 is turned in the direction of arrow c into the reverse film feed position, while the components of the projector are in the single-frame projection position, then film 86 can be moved in the reverse direction for projection. At this time, the components of the projector are held in the same position as occupied in the single-frame projection, even if cam group 1 is rotated into the reverse film feed position, with only normal-reverse rotation switching lever being positioned in the reverse film feed position by virtue of its engagement with cam groove 13a of cam 13. Thus, motor M is conditioned for driving the film in the reverse direction, and gear 54 (FIG. 3) is engaged with gear 51. Dielectric disc 58' is rotated with operating knob 3 and conducting plate 60 thus interconnects the circuit closing contact 61 and 62 of motor M, thereby energizing the motor. Rotation of motor M is transmitted, through gear 54, to gear 51, and gear 51 causes sleeve 48 to rotate because of the frictional engagement between gear 51 and flange 48a. This rotation is transmitted, through gear 50 and the associated gear train (not shown), to the film supply reel shaft (not shown) to rotate the latter in the reverse direction. The film take-up reel is disconnected from the drive mechanism, and rotation of the film supply reel shaft in the reverse direction causes film 86 to move, in the reverse direction, past aperture 40a of plate 40 so that the frames of the film are projected onto the screen in the reverse order. Rubber resistance roller 33 is rotated, from the locked position in FIG. 5, clockwise by the film moving in the reverse direction, but is locked again as pawl 32 engages, from above, against pawl 17b.

Automatic film rewinding can be effected readily by the invention device when a projector uses a film, such as a film housed in a film cartridge, whose trailing end is secured to the film supply reel cartridge. However, if the film used is of the open reel type, which does not have its trailing end secured to the supply reel, there will be no tensioning of the film as the film has been substantially fully paid out from the supply reel, and consequently no pressing of the film against arm 82 (FIG. 7) will occur, so that the end of the film will be released from the film supply reel and all the film will be wound on the take-up reel. In such a case, it is necessary to directly connect the end of the film on the take-up reel to the supply reel shaft before effecting rewinding.

Referring to FIG. 1, a pin 91, secured to a normal direction film movement cancellation member 90 mounted for vertical sliding movement on the projector body, is positioned above arm 82 and resilient member 85 in the film supply section. Cancellation member 90 is biased upwardly by a spring 92. If all the film 86 is wound on the take-up reel, knob 3 is placed in a neutral position and motor M is also conditioned to be neutral so that it stops rotating. If now the end of the film wound on the take-up reel is connected to the supply reel shaft, and cancellation member 90 is moved downwardly, arm 82 will be moved downwardly by pin 91 and the device can be actuated in the same manner as already described for automatic rewinding of the film. Thus, the film supply reel shaft will rotate in a reverse direction to rewind the film thereon. The rewinding operation can be stopped by restoring operating knob 3 to a neutral position. If cancellation member 90 is actuated while the film is being fed forwardly, for projection, it is possible to effect rewinding of the film even while the parts are otherwise in the condition for forward feed of the film.

In the described embodiment of the invention, a rubber roller 33 has been described as provided for offering resistance to film movement in the film supply section. However, this rubber roller can be replaced by a sprocket wheel connected to the motor through a suitable clutch mechanism. A control lever, like lever 19 for operating clutch ring 45 of shifter 41, can be used for controlling such clutch mechanism.

From the foregoing, it will be appreciated that the automatic film rewind device for movie projectors, embodying the invention, is simple in construction and permits obtaining an overall compact size in a movie projector, because of the fact that the operation of various parts of the projector is controlled by a control cam group provided on a single shaft. Film movement in the forward direction for projection can be cancelled by the tensioning of the end portion of the film, thereby effecting automatic rewinding of the film in a positive manner. When the film is automatically rewound, operating knob 3 is rotated to the same position as when the film is moved in a reverse direction for projection, so that it is possible to effect automatic rewinding of the film and movement of the film in the reverse direction for projection while operating knob 3 is in the same position, which is very convenient.

Furthermore, the invention device permits readily effecting single-frame projection or projection of the film while moving in the reverse direction, because it is possible to hold the film pressing plate, through the holding member, in the path of travel of the film for holding the film for projection while the drive mechanism is brought to a neutral or reverse direction film movement position.

The provision of the normal direction film movement cancellation member 90 permits manual rewinding of the film as well as automatic rewinding. Thus, the invention device lends itself to use with both a film cartridge and an open reel. The last, but not the least, important advantage of the invention is that the device permits effecting rewinding of the film while the film is being moved in a normal direction for projection, by virtue of the provision of the normal direction film movement cancellation member 90.

While a specific embodiment of the invention has been shown and described in detail to illustrate the application of the principles of the invention, it will be understood that the invention may be embodied otherwise without departing from such principles.

What is claimed is:

1. In a small movie projector of the type having a film supply section, a projection lamp, components, including a driving motor, for driving the film in a forward film feed direction and a reverse film rewind direction, a control cam group, externally accessible operating means operable to move the control cam group between forward film feed, neutral, and reverse film feed positions, a control lever group operatively associated with and movable by the control cam group and including an operating lever operable to move a film pressing plate in and out of an operating position, a clutch operating lever controlling a clutch connecting a film supply shaft to the driving motor, and a forward-reverse direction switching lever controlling the direction of film movement, and locking means operable to lock the levers of the control lever group in positions to which they are moved when the control cam group is moved to its forward film feed position: an automatic film rewind device comprising, in combination, resilient means biasing said control cam group to its reverse film feed position; a cam group locking lever operatively associated with said control cam group and operable to releasably lock said control cam group in either its forward film feed position or its neutral position; a pivoted member having an arm engaged with a slack portion of film, secured at its trailing end to said film supply shaft, when the film is screened, and caused to pivot by the film when the film is tensioned to remove the slack; and a release member operable by said pivot member when the latter is pivoted by the film; said release member having an inclined edge engaged with an end of said cam group locking lever; said inclined edge, responsive to movement of said release member by said pivoted member, moving said cam group locking lever to disengage said control cam group, in its forward film feed position, for movement of said control cam group to its reverse film feed position by said resilient means.

2. An automatic film rewind device, as claimed in claim 1, including rotatable means engaged with the film and operable to offer resistance to film movement; a holding member operable to hold and lock said control lever group in the forward film feed position; said externally accessible operating means being effective to move said control cam group to the neutral and reverse feed positions while said holding member holds and locks said control lever group in the forward film feed position; said rotatable means being rendered ineffective responsive to said clutch being disengaged when said control cam group is moved to its neutral position, to effect single-frame projection; said rotatable means being rendered temporarily ineffective and said clutch being engaged responsive to movement of said control cam group to the reverse film feed position to effect projection of the film while the latter is moving in the reverse direction.

3. An automatic film rewind device, as claimed in claim 2, in which said rotatable means comprises a rubber roller engaged with the film; and means operable to lock said rubber roller against rotation responsive to movement of said holding member to hold and lock said control lever group in the forward film feed position.

4. An automatic film rewind device, as claimed in claim 2, including externally accessible manually actuated means operable to move said holding member to release its locking of said control lever group to effect rewinding of the film while said components are set to move the film in the forward film feed direction and to effect rewinding of the film on a supply reel shaft when the end of the film is not secured to the supply reel shaft.

5. An automatic film rewind device, as claimed in claim 1, in which said externally accessible operating means comprises a control knob; and a shaft secured to said control knob; the cams of said control cam group being fixedly mounted on said shaft.

6. An automatic film rewind device, as claimed in claim 5, including a pair of spaced fixed contacts controlling an energizing circuit for said driving motor; and a circuit closure means secured to rotate with said shaft and operable, upon movement of said control knob in either direction from its neutral position, to interconnect said fixed contacts to complete the energizing circuit for said driving motor.

7. An automatic film rewind device, as claimed in claim 5, in which said control lever group includes a pivoted power source lever; a pair of fixed spaced contacts controlling an energizing circuit for said projection lamp; and a circuit closer on said power source lever operable, upon movement of said control knob to the forward film feed position, to interconnect said contacts to energize said projection lamp.

8. An automatic film rewind device, as claimed in claim 5, including a horizontally movable support member for said film pressing plate; said pressing plate operating lever being engaged with said support member and operable, responsive to movement of said control knob to the forward film feed position, to move said support member to position said pressing plate in the path of film movement; said holding member holding and locking said support member in its operated position.

9. An automatic film rewind device, as claimed in claim 5, including a rotation limiting member secured to said shaft; said resilient means comprising a tension spring having an end secured to said rotation limiting member; a first fixed stop engageable by said rotation limiting member upon movement of said control knob to the forward film feed position; and a second fixed stop engageable with said rotation limiting member upon operation of said release means; said second fixed stop carrying resilient sleeve means engageable with said rotation limiting member.

10. An automatic film rewind device, as claimed in claim 5, in which said control cam group includes a disc cam formed with a cam slot; said normal-reverse direction switching lever having a pin engaged in said cam slot; said switching lever controlling said driving motor to operate in either the forward film feed direction or the reverse film feed direction.

* * * * *